(12) United States Patent
Mitchell

(10) Patent No.: US 7,187,927 B1
(45) Date of Patent: Mar. 6, 2007

(54) GLOBAL CELL PHONE SYSTEM AND METHOD FOR AIRCRAFT

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 31 days.

(21) Appl. No.: 11/151,090

(22) Filed: Jun. 13, 2005

(51) Int. Cl.
 *H04Q 7/20* (2006.01)
(52) U.S. Cl. ............... 455/431; 455/432.1; 455/432.2
(58) Field of Classification Search ............... 455/431, 455/432.1, 432.2, 432.3, 12.1, 427, 428, 455/429, 436
See application file for complete search history.

(56) References Cited

U.S. PATENT DOCUMENTS

| | | | |
|---|---|---|---|
| 6,684,056 B1 * | 1/2004 | Emmons et al. | 455/12.1 |
| 7,058,401 B1 * | 6/2006 | Sinivaara et al. | 455/431 |
| 2004/0142658 A1 * | 7/2004 | McKenna et al. | 455/11.1 |

OTHER PUBLICATIONS

"Using Your Cell Phone on Airplanes", FCC Consumer Advisory, Jan. 12, 2005.

"FCC to Examine Ban on Using Cellular Telephones on Airborne Aircraft", FCC News, Dec. 15, 2004.

"Personal Cell Phone Use Inflight", AirCell Presentation to the WAEA Technical Committee, Jul. 30, 2002.

Co-pending Patent Application entitled "Cell Phone Audio/Video In-Flight Entertainment System" by James P. Mitchell, being filed on the same day.

* cited by examiner

*Primary Examiner*—Barry Taylor
(74) *Attorney, Agent, or Firm*—Nathan O. Jensen; Kyle Eppele

(57) ABSTRACT

A global airborne cell phone system is used for cell phone calls by using a pico cell. A switch connected to the pico cell switches the cell phone call between a first radio that transmits to a first satellite system and a second radio that transmits to a second satellite system. A navigation system provides aircraft position data. A processor switches the call to the first radio and to the second radio according to coverage of the first satellite and the second satellite for a current aircraft position. A cell phone of a second type makes calls to a pico cell of the second type. A second switch connected to the pico cell of the second type switches the cell phone call between the first radio and the second radio according to coverage of the first satellite and the second satellite for the current aircraft position.

9 Claims, 4 Drawing Sheets

GLOBAL CELL PHONE SYSTEM AND METHOD FOR AIRCRAFT

CROSS REFERENCE TO RELATED APPLICATIONS

The present application is related to application Ser. No. 11/151,108, filed herewith Jun. 13, 2005, entitled "Cell Phone Audio/Video In-Flight Entertainment System" by James P. Mitchell. The co-filed application is incorporated by reference and is assigned to the assignee of the present invention.

BACKGROUND OF THE INVENTION

The present invention relates to cellular telephone communications systems and specifically to an airborne cellular telephone communications system that provides seamless global in-flight coverage.

Use of cellular telephones and other wireless data devices on board aircraft has been banned by the Federal Communications Commission (FCC) and restricted by the Federal Aviation Administration (FAA). The FCC ban is in place to avoid interference with terrestrial cellular systems while an aircraft flies over a cellular network. The FAA regulations restrict the use of cell phones on an aircraft to ensure against interference to onboard communications and navigation equipment. The FCC recently has announced that it is going examine relaxing its ban on cell phone use in aircraft. A relaxation in the FCC rules will still be subject to the rules and policies of the FAA and aircraft operators.

The FCC is proposing to permit airborne use of cell phones and other wireless devices at the devices lowest power settings under control of a pico cell located on the aircraft and only if such operation does not interfere with terrestrial cellular systems. In small cell phone networks pico cells are the smallest of radio cells. Pico cells often extend to just a few hundred meters in diameter in ground applications. Pico cells are generally used to fill in areas of poor coverage or provide coverage in remote locations where there is not standard cellular service available. On board an aircraft a cell phone user makes a call that goes to the pico cell. The pico cell then communicates from the aircraft using a transceiver to a ground station or to a satellite and from the satellite to a ground station and to finally connect to a public switched telephone network (PSTN).

While the pico cell system offers a solution for onboard aircraft installations, a need exists among passengers to use cell phones globally through such satellite communications systems (SATCOM) as Globalstar and Inmarsat. It is also desirable to have a pico cell system that operates with all popular cell phone standards such as CDMA, GSM, 2.5G, 3G and others for true global service compatibility.

Globalstar is a mobile satellite voice and data communications service that covers North America and 120 countries worldwide. Globalstar uses a low earth orbit (LEO) satellite system to provide mobile satellite communications services to hand-held and vehicle-mounted user equipment. Globalstar utilizes a version of code division multiple access (CDMA) technology based upon the IS-95 CDMA standard to provide voice, data, and fax services.

Inmarsat is a global mobile satellite communications system that delivers phone, fax and data communications to ground, maritime and aeronautical users around the globe. Inmarsat operates a constellation of geostationary satellites to provide communications to every part of the world, except the Polar Regions.

Cell phones today are just beginning to enable high-speed data usage. The future will have even faster data ability with 2.5 and 3G phones requiring 80 kbps to greater than 1 Mbps. This currently surpasses current aircraft voice and data telephony capability. Existing SATCOM telephony system options are not capable of meeting the demand for fully supporting a plurality of 3G data enabled cell phones per aircraft in a region having hundreds or thousands of aircraft. Furthermore current services simply are not economical to the average consumer.

Current solutions proposed by industry players only offer partial coverage or performance solutions. There is a need for seamless global in-flight cell phone coverage. Furthermore, a need exists for an in-flight cell phone system capable of functioning with a variety of cell phone technologies. A need also exists for providing needed cell phone data rates at lowest costs.

SUMMARY OF THE INVENTION

A global airborne cell phone system is disclosed that comprises at least one cell phone of a first type for making a cell phone call to a pico cell of the first type. A first switch is connected to the pico cell of the first type for switching the cell phone call. A first satellite radio is connected to the first switch for receiving the cell phone call from the first switch and transmitting the cell phone call to a first satellite in a first satellite system. A second satellite radio is connected to the first switch for receiving the cell phone call from the first switch and transmitting the cell phone call to a second satellite in a second satellite system. A navigation system provides aircraft position data. A database stores satellite system parameters and service data. A processor is connected to the first switch, the first satellite radio, the second satellite radio, the database, and the navigation system for switching the pico cell of the first type to the first satellite radio and to the second satellite radio according to coverage of the first satellite and the second satellite for a current aircraft position.

The global airborne cell phone system further comprises at least one cell phone of a second type for making a cell phone call. A pico cell of the second type receives the cell phone call. A second switch connected to the pico cell of the second type switches the cell phone call. The first satellite radio is connected to the second switch for receiving the cell phone call from the second switch and transmitting the cell phone call to the first satellite in the first satellite system. The second satellite radio is connected to the second switch for receiving the cell phone call from the second switch and transmitting the cell phone call to the second satellite in the second satellite system. The processor is connected to the second switch for switching the pico cell of the second type to the first satellite radio and to the second satellite radio according to coverage of the first satellite and the second satellite for the current aircraft position.

Satellite coverage data are programmed into the database for the processor to correlate the current aircraft position with a corresponding set of satellite coverage area data to select a satellite.

In the global airborne cell phone system the first satellite radio may be a low earth orbit satellite radio such as a Globalstar radio and the second satellite radio may be a geostationary satellite radio such as an Inmarsat radio.

In the global airborne cell phone system the processor performs an algorithm using the current aircraft position and a projected heading to identify satellite services for an aircraft position and switches in an appropriate satellite radio. The algorithm uses aircraft position data to switchover from one satellite to a next satellite based on known satellite beam coverage regions.

The processor performs an algorithm that produces a switchover from one satellite beam to another satellite beam when the first beam has reduced beam power and the second beam has increased beam power as the aircraft traverses forward. The switchover occurs between beams from a same satellite system as the aircraft moves from the coverage of one satellite to a next satellite within the same satellite system.

The processor performs an algorithm using the current aircraft position and data stored in the database to select a satellite for at least one of a lowest cost service, a highest quality service, a highest data rate service, and a low or high latency service.

It is an object of the present invention to provide an airborne cell phone system with seamless global coverage.

It is an object of the present invention to provide better options for global air-to-ground service selection based on geographical position and regional cost structures.

It is an advantage of the present invention to operate with popular cell phone standards for true global service compatibility.

It is an advantage of the present invention to utilize airborne pico cells to be in compliance with regulatory requirements.

It is a feature of the present invention to work with current and future satellite communications systems.

It is a feature of the present invention to provide switching between satellite communications systems to provide optimum coverage and service.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for an aircraft cell phone system with a cabin cell phone pico cell and a navigation system that continuously resolves aircraft position and provides switching between SATCOM and direct air-to-ground systems to optimize global cell phone coverage.

Figure 1:
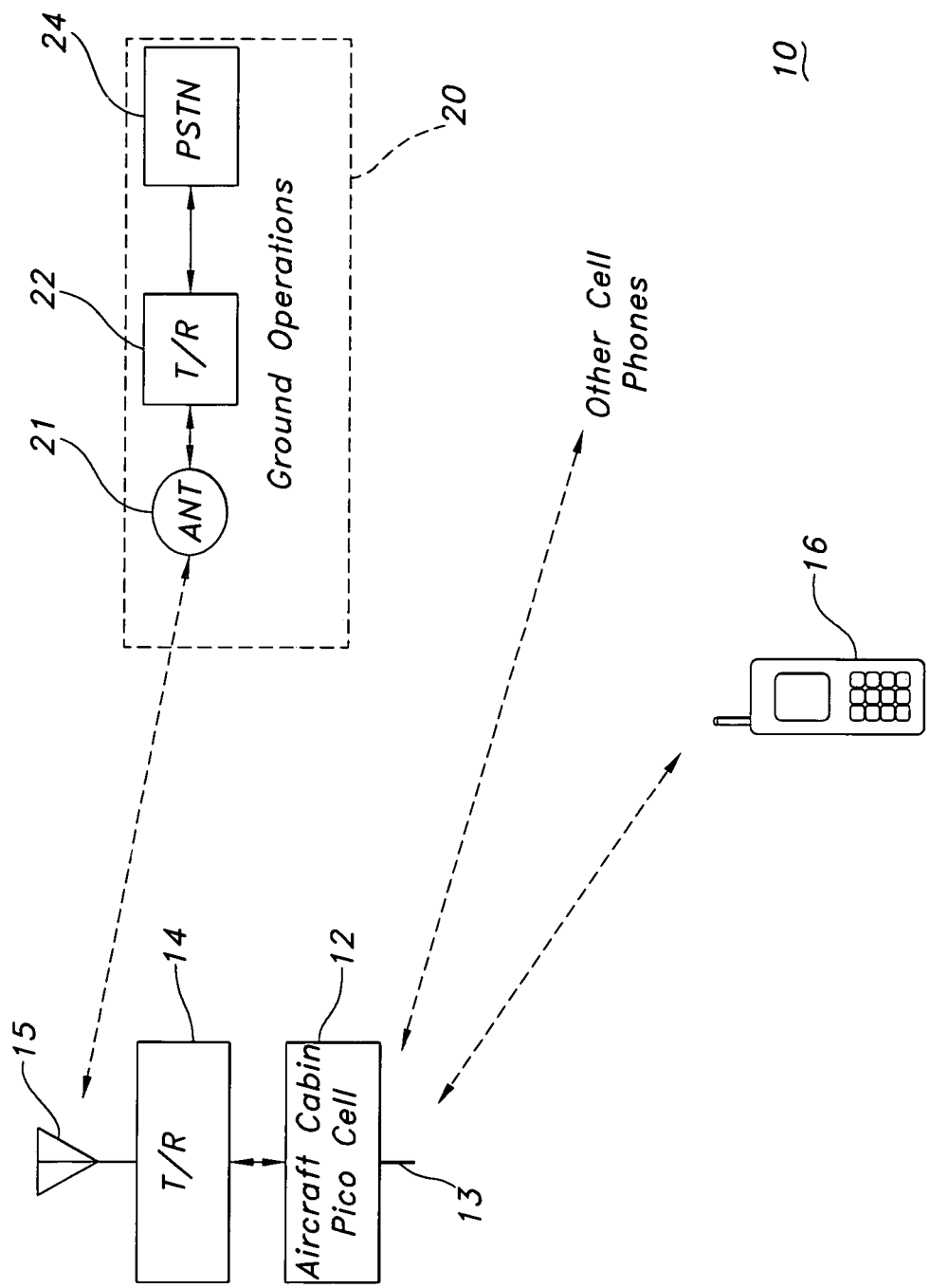
FIG. 1 is a block diagram of an approach under consideration to implement an airborne cellular network using a cabin pico cell.

FIG. 1 shows an approach under consideration for approval by the FCC and being planned by several suppliers to implement an airborne cellular network 10. An aircraft cabin pico cell 12 is used in an aircraft to provide an interface for a passenger cell phone 16 over an air-to-ground ISDN link to a cellular ground operations center 20. The system 10 can support many cell phones 16. The pico cell 12 provides the functionality of a terrestrial cell and may function with CMDA, GSM, UMTS or other cell phone protocols. A passenger places a voice, data, or video conference call initiated by the cell phone 16 that is received by pico cell antenna 13, processed by the pico cell 12 and sent to a radio transceiver 14 and then to an aircraft antenna 15 for direct transmission to the cellular ground operations center 20. At the ground operations center 20, the call is received by a ground antenna 21 and a ground transceiver 22 and then connected to a public switched telephone network (PSTN) 24 through a service provider (not shown). Calls originating on the ground from the PSTN 24 follow a reverse path. Using this approach the power controlled low-power cell phone 16 operates with the pico cell 12 and transceiver 14 that operates at frequencies different than terrestrial cellular telephone networks to avoid interference. The air-to-ground ISDN link may also be a satellite ISDN link that operates through a satellite (not shown) at frequencies that do not interfere with terrestrial cellular networks.

Figure 2:
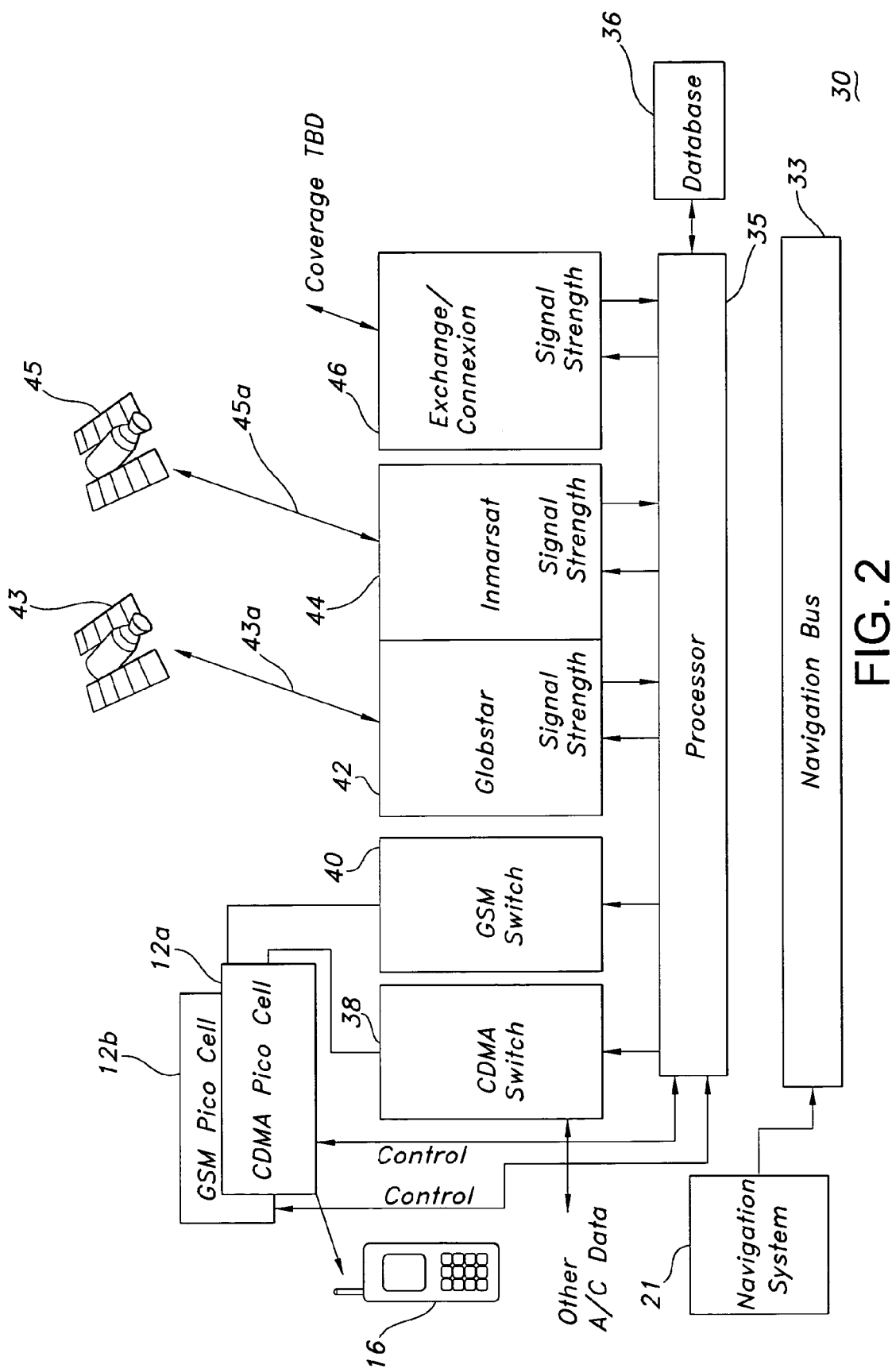
FIG. 2 is block diagram of the global airborne cell phone system of the present invention.

The global airborne cell phone system of the present invention 30 is shown in FIG. 2. In FIG. 2, cell phone 16 communicates with a first type pico cell 12a that may be a CDMA pico cell or a second type pico cell 12b that may be a GSM pico cell, depending on the type of cell phone 16 in use. Other types of cell phones and pico cells may also be used. While only one cell phone 16 is shown in FIG. 2, the present invention is capable of operating with a plurality of cell phones 16 of different types. The cell phones 16 may also include such other devices as lap top computers (not shown) with wireless cellular transceiver cards and still be within the scope of the present invention.

A client cell phone 16 type may be identified when the client dials into the pico cells 12a and 12b by manual key-in entry through a menu from the cell phone key pad and decoded at the pico cells 12a and 12b. The setup process may also be automatic if allowed by the cell phone 16 either directly from the cell phone protocol, control word, or inferenced automatically from an electronic serial number (ESN) or mobile serial number (MSN) identification of the phone where the number is cross referenced to a model or phone type.

CDMA pico cell 12a is connected to a first (CDMA) switch 38 and GSM pico cell 12b is connected to a second (GSM) switch 40. CDMA switch 38 and GSM switch 40 switch the pico cells 12a and 12b to a Globalstar radio 42 and an Inmarsat radio 44 as needed under control of a processor 35. Globalstar radio 42 communicates with Globalstar satellite 43 with satellite beam 43a as part of the Globalstar satellite communications system. Inmarsat radio 44 communicates with Inmarsat satellite 45 with satellite beam 45a as part of the Inmarsat satellite system. A signal strength output from the Globalstar radio 42 and the Inmarsat radio 44 is optionally connected to the processor 35 to provide a signal strength indication. Future satellite communications system capabilities may be added to the system 30 such as that shown by an Exchange/Connexion radio 46 with satellite beam coverage to be determined.

The Globalstar radio 42, the Inmarsat radio 44, and future radio 46 are shown in FIG. 2 as separate radios. The functionality of the Globalstar radio 42, the Inmarsat radio 44, and any future radio 46 may be included in a single software defined radio capable of being programmed for and switched between each of these functions.

A navigation system 31 that may be a GPS system continuously provides aircraft position in the global airborne cell phone system 30 of the present invention. The navigation system 31 provides aircraft position over a navigation data bus 33 to the processor 35 that accepts current GPS/ navigation information to resolve current and future aircraft position to accurately predict current and future communication satellite beam coverage regions from the Globalstar satellite 43 and the Inmarsat satellite 45. The processor 35 retains a database 36 of subscribed communications satellite performance parameters and beam coverage and air-to-ground services performance parameters and coverage for correlating against aircraft position determined from the navigation system 31. Satellite beam coverage data is produced and published by the satellite companies for customer and regulatory agency use. The database 36 satellite coverage data may be updated by system remote login and from radio signal strength inputs.

Figure 3:
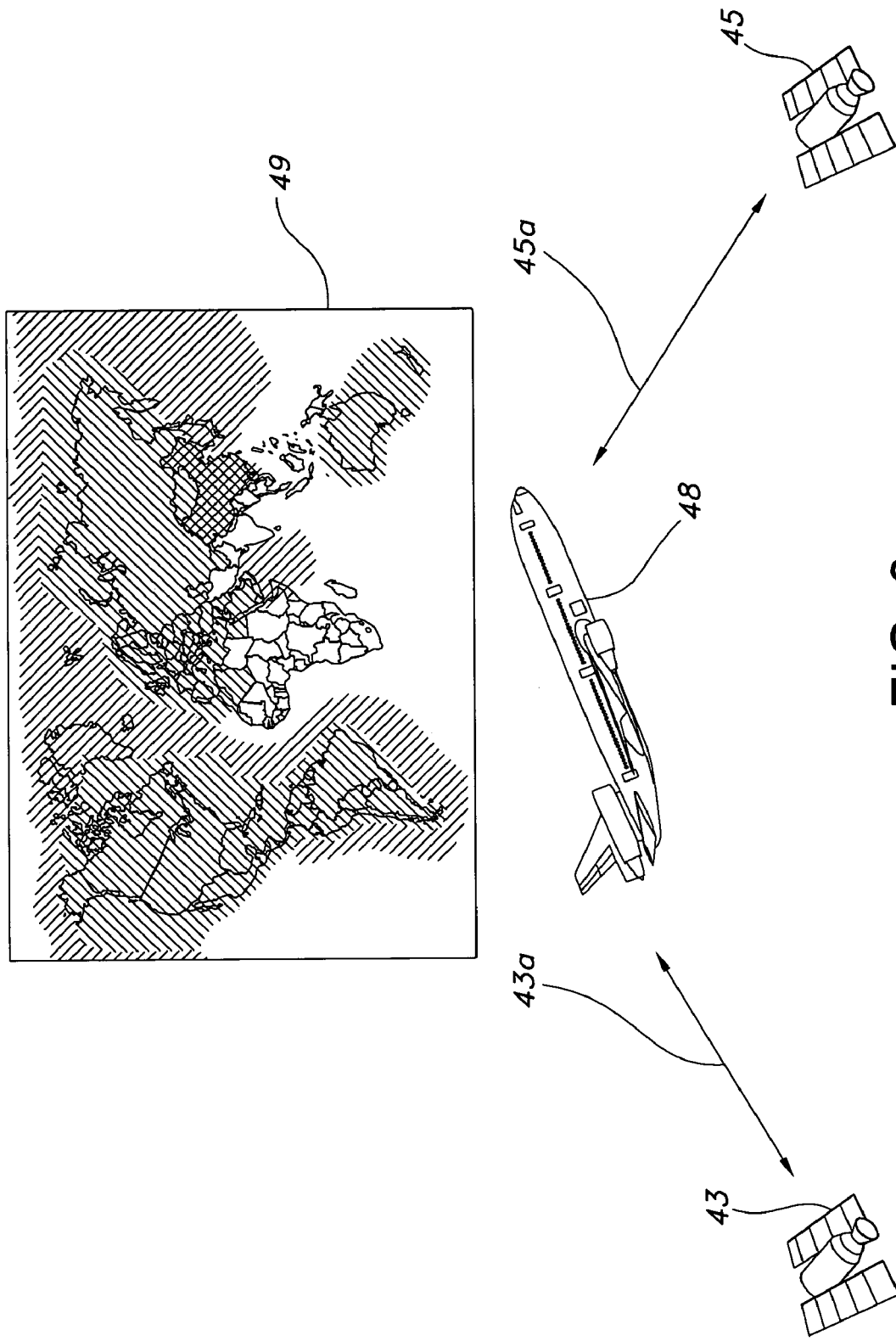
FIG. 3 shows an aircraft flying some where on the earth with the global airborne cell phone system of the present invention onboard along with a map showing coverage provided by Globalstar and Inmarsat satellites.

FIG. 3 shows an aircraft 48 flying some where on the earth with the system 30 of the present invention onboard. A map 49 shows the coverage provided by Globalstar satellite 43 and Inmarsat satellite 45. The Globalstar satellite system (LEO) provides regional coverage of the earth with no coverage in the grey areas. The Inmarsat satellite system (GEO) provides the regional coverage of the Globalstar system plus most of the remaining areas of the globe with the exception of the Polar Regions. The Globalstar system offers lower communications latency than the GEO systems. There are times when lower latency is required when coverage is available form the Globalstar system. There are times when GEO systems with greater coverage are needed and low latency is not important.

The system 30 of the present invention includes both regional beam satellites (Globalstar 43) and global beam communications satellites (Inmarsat 45). A selection between satellites 43 and 45 is determined by algorithms performed by processor 35 using position data of the aircraft 48 from the navigation system 31 to determine which satellite transmit/receive beams (43a or 45a) the aircraft 48 is under. For example a regional beam 43a may belong to Globalstar and a global beam 45a belonging to Inmarsat. The system 30 uses an identified position and a future state of the aircraft 48 to establish and maintain a link with satellites 43 and 45 as the aircraft 48 enters and leaves coverage zones of the satellite beams 43a and 45a.

An algorithm performed by processor 35 uses aircraft position and projected heading and subsequently identifies subscribed satellite voice and data services for the aircraft position and switches in the appropriate satellite 43 or 45. The algorithm uses GPS/navigation information to prepare network switchover from one satellite system to the next based on known beam coverage regions as shown on the map 49 in FIG. 3.

An algorithm performed by the processor 35 produces a switchover from one satellite beam 43a to another 45a when the first beam 43a has reduced beam power and the second beam 45a has increased beam power as the aircraft 48 traverses forward. The switchover may also occur between beams from the same satellite system (43 or 45) as the aircraft 48 moves from the coverage of one satellite to the next within the system.

The system 30 also includes weighted decision algorithms performed by the processor 35 for selecting a lowest cost service, a low or high latency service, a highest quality service, or a highest data rate service. Satellite beam coverage data are programmed into the database 36 enabling the processor 35 to use a cognitive algorithm process or by vector table searches correlate the aircraft position with a corresponding set of satellite and/or transponder beam coverage area data for low cost service, high or low latency service, highest quality voice service, or highest data rate service from the satellites.

The algorithms use the GPS or navigation position location and determine which satellite (43 or 45) and/or satellite beam (43a or 45a) assigned to that location has the lowest cost voice or VoIP phone call. The algorithms may also select between high and low latency satellite choices where they exist and as correlated to client communication service requirements for voice with low latency or data with either low or high latency.

Moving from one SATCOM satellite (43 and 45) to another results in wide ranges of data communications latency. Latency can produce issues with pico cell (12a and 12b) performance or ability to operate. The SATCOM ISDN data link latency can be estimated by pinging a network radios (42 and 44) or switches (38 and 40) at any point on the network. Latency figures may then be used to make adjustments to aircraft pico cell (12a and 12b) trunk protocol parameters during a call and each time a call is set up.

The algorithms may also use the GPS or navigation position location to determine a satellite and/or satellite beam assigned to that location that has the highest quality voice or VoIP phone call by weighting a user bit rate as a quality of service (QoS) factor in making a decision to select between one or more available data satellites subscribed to. Likewise, the algorithms also use the aircraft position information and determine which satellite has the highest data rate available for a particular location. Functioning of a QoS process is described in more detail below.

With the system 30 of the present invention, when a cell phone 16 on board the aircraft initiates a call, the algorithm performed by processor 35, detects phone quality of service (QoS) needs and directs the call through an appropriate available air-to-ground or SATCOM system according to the best match to the QoS needs of that user.

Figure 4:
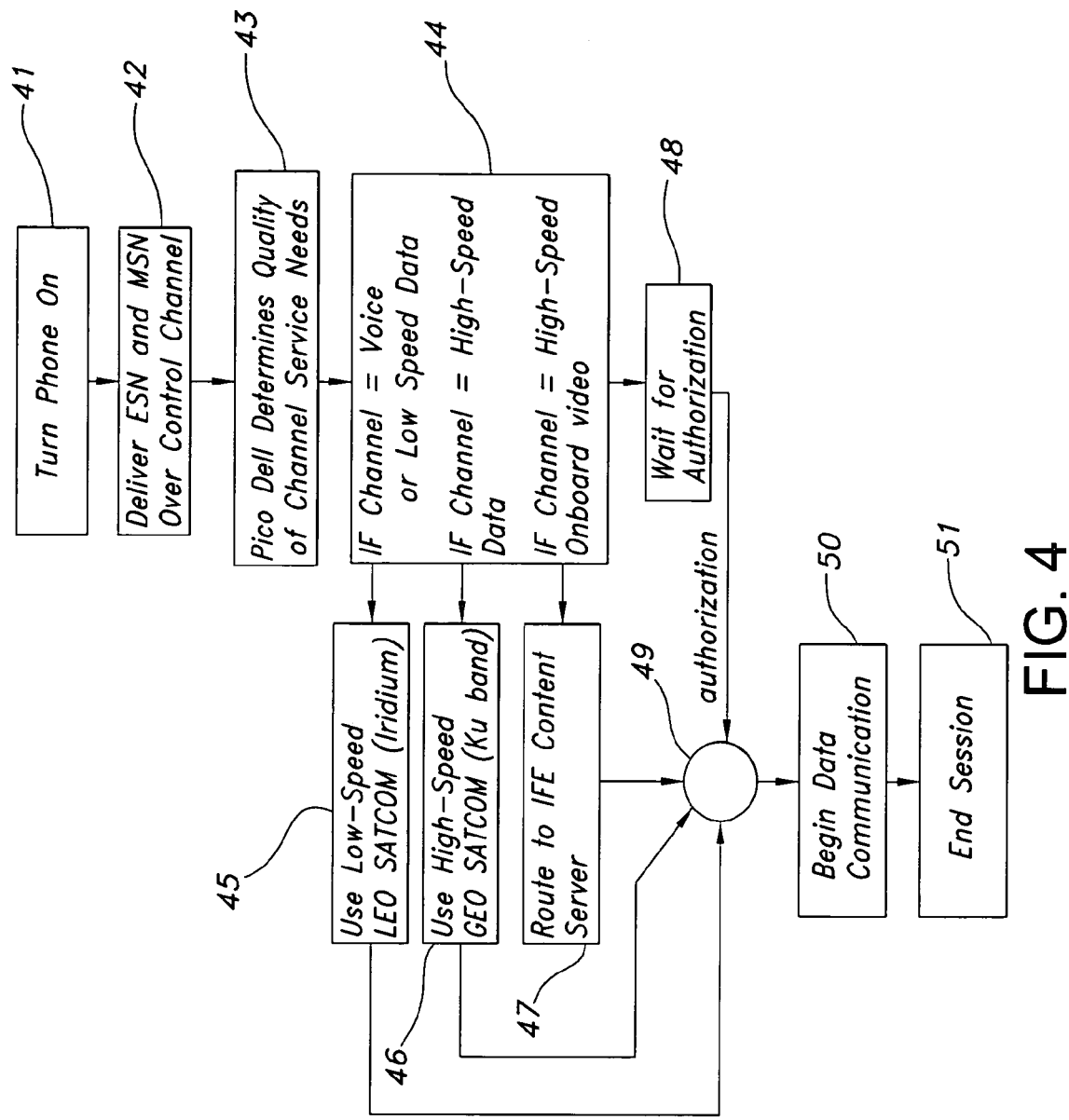
FIG. 4 is a flow chart depicting quality of service process operation of the present invention.

A flow chart depicting QoS process operation is shown in FIG. 4. The cell phone 16 is turned on and a call is made at step 41 and QoS process is started. At step 42 the ESN or MSN are delivered over a cellular system control channel. At step 43 the pico cell determines quality of service (QoS) needs from a QoS indicator from the cell phone 16. If a voice call is needed at step 44, the QoS indicator goes into an algorithm that directs the call to a low earth orbit (LEO) system such as Iridium as indicated by step 45. Since voice is the only need, 2.4 kbps is sufficient as provided by the Iridium system. Alternatively at step 44 if the user has a 3G data phone and wishes to send a graphics attachment that requires high speed data, the QoS algorithms detects the type of service needed and directs the call through a geosynchronous earth orbit (GEO) satellite such as a two-way Ka or Ku band satellite (step 46). If the user requests a movie from the media server 33 at step 44, the user request is routed to the media server 33 for stored movies, Internet, or satellite video at step 47. At step 48 authorization is waited for. Step 49 enables the selected service from step 45, 46, or 46 when authorization is received. At step 50 data communications begins until completion at step 51, end of session.

In the global airborne cell phone system channel error control and protocol parameters may be selected or driven by measured channel conditions and/or a position locations system such as GPS. Position location of the aircraft may be used to estimate link loss on a band in use such as the 800-MHz air-to-ground band (we don't show an air-to-ground link). An appropriate protocol and error correction method may be applied the aircraft may transition to an alternate communications system.

It is believed that the global cell phone system and method of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of providing cell phone communications with a global airborne cell phone system comprising the steps of:
making a cell phone call with a cell phone of a first type;
receiving the cell phone call with a pico cell of the first type;
switching the cell phone call with a first switch connected to the pico cell of the first type;
receiving the cell phone call from the first switch with a first satellite radio connected to the first switch;
transmitting the cell phone call to a first satellite in a first satellite system;
receiving the cell phone call from the first switch with a second satellite radio connected to the first switch;
transmitting the cell phone call to a second satellite in a second satellite system;
providing aircraft position data with a navigation system;
storing satellite system parameters and service data in a database; and
switching the pico cell of the first type to the first satellite radio and to the second satellite radio according to coverage of the first satellite and the second satellite for a current aircraft position with a processor connected to the first switch, the first satellite radio, the second satellite radio, the database, and the navigation system;
initiating a call with the cell phone;
delivering an electronic serial number over a control channel;
determining with the pico cell quality of service (QoS) needs from a QoS indicator from the cell phone;
directing the call to a low earth orbit satellite system if a voice call is needed;
directing the call to a geosynchronous earth orbit satellite if high speed data is needed;
waiting for authorization;
enabling a selected service when authorization is received;
beginning data communications; and
completing data communications.

2. The method of claim 1 further comprising the steps of:
making a cell phone call with a cell phone of a second type;
receiving the cell phone call with a pico cell of the second type;
switching the cell phone call with a second switch connected to the pico cell of the second type;
receiving the cell phone call from the second switch with the first satellite radio connected to the second switch;
transmitting the cell phone call to the first satellite in the first satellite system;
receiving the cell phone call from the second switch with the second satellite radio connected to the second switch;
transmitting the cell phone call to the second satellite in the second satellite system; and
switching the pico cell of the second type to the first satellite radio and to the second satellite radio according to coverage of the first satellite and the second satellite for the current aircraft position with the processor connected to the second switch.

3. The method of claim 1 further comprising the steps of:
programming satellite coverage data into the database;
correlating the current aircraft position with a corresponding set of satellite coverage area data to select a satellite.

4. The method of claim 1 further comprising the steps of:
performing an algorithm with the processor using the current aircraft position and a projected heading to identify satellite services for an aircraft position; and
switching in an appropriate satellite radio.

5. The method of claim 4 further comprising the step of using aircraft position data to switch over from one satellite to a next satellite based on known satellite beam coverage regions.

6. The method of claim 1 further comprising the step of performing an algorithm with the processor that produces a switchover from one satellite beam to another satellite beam when the first beam has reduced beam power and the second beam has increased beam power as the aircraft traverses forward.

7. The method of claim 6 further comprising the step of switching over between beams from a same satellite system as the aircraft moves from the coverage of one satellite to a next satellite within the same satellite system.

8. The method of claim 1 further comprising the step of performing an algorithm using the current aircraft position and data stored in the database to select a satellite for at least one of a lowest cost service, a highest quality of service, a highest data rate service, and a low or high latency service.

9. The method of claim 1 further comprising the steps of:
initiating a call with the cell phone;
performing an algorithm to detect quality of service (QoS) needs; and
directing the call through an appropriate available SATCOM system according to a best match to the QoS needs of the cell phone.

* * * * *